May 22, 1956 CARL-ERIK GRANQVIST 2,747,181
RADIO BEACONS

Filed Jan. 5, 1953 2 Sheets-Sheet 1

INVENTOR.
CARL-ERIK GRANQVIST

BY

ATTORNEY

May 22, 1956 — CARL-ERIK GRANQVIST — 2,747,181

RADIO BEACONS

Filed Jan. 5, 1953

United States Patent Office 2,747,181
Patented May 22, 1956

2,747,181

RADIO BEACONS

Carl-Erik Granqvist, Lidingo, Sweden, assignor to Hazeltine Research, Inc., Chicago, Ill., a corporation of Illinois Application January 5, 1953, Serial No. 329,522

Claims priority, application Sweden February 23, 1952

12 Claims. (Cl. 343—106)

General

So-called speaking or talking radio beacons have great possibilities which make them attractive for use in direction indicating radio beacons, especially for air traffic. The advantages are, amongst others, that one may with a cheap and simple receiver on the airplane obtain advice about the bearing to the place where the radio beacon is situated, and that good precision may be obtained. Further, no complicated handling of the receiver by the personnel on the approaching airplane is required. The range of a normal speaking beacon in usual flying altitudes is 150 to 200 kilometers, and the bearing accuracy has under advantageous conditions been measured at from 2 to 3 degrees.

There are no especially high demands on the type of surroundings about the beacon because it is rather unimportant, if reflection takes place from the surroundings since the lobe of the antenna directional characteristic of the radio transmitter, directed on to the receiver, is very narrow and will therefore be influenced by adjacent topographical formations to a rather small extent.

These speaking radio beacons have been provided with a directional antenna of such a kind that one obtains one or more sharply directed directional lobes limited to a narrow radiation angle. Now it may of course from time to time occur that topographical formations in the neighbourhood of the transmitter location will catch the wave radiated from such a directional antenna in an angular position of the transmitter characteristic when this wave is not directed on to the receiver. By reflection these formations may retransmit this "false" signal to the receiver where it may cause misunderstandings and an erroneous bearing indication. In order to prevent this one has also proposed, on the same frequency as that one with which the bearing indications are transmitted, to transmit a covering field modulated by an audio frequency oscillation but in all directions in which the lobes of the bearing indicating field are not directed. Another reason for the introduction of such a covering field has been that most antennas, which create such a sharply directed radiation which is required in the present case, namely antennas which have so-called cigar-formed lobes in the directional characteristic, are also subject to disturbing side lobes of perhaps weaker intensity which may be sufficient for creating an erroneous indication.

Tests have proved that one should with a good speaking radio beacon of the kind mentioned obtain an accuracy in the statement of the bearing which should not produce a greater bearing error than about 2°, but in practice it has proved that these accuracies could not always be reproduced because unavoidable indication errors arose.

The present invention is based upon an investigation of the reason for these errors. In this investigation it has proved that the errors arise for from the following reason.

The bearing indicating field and the covering field should have the same frequency. In angles, represented by the outer limitation lines of the bearing indicating field lobes, a certain reception of the covering field should take place in order that this field should act effectively. Within these angular positions the receiver will therefore simultaneously catch the bearing indicating field and the covering field. In order that these should not disturb each other, it is important that they are very accurately 90° displaced in phase relative to each other. There is no difficulty in providing this phase position between the bearing indicating signal and the covering field signal in the beacon transmitter, but this will form no assurance that the receiver will also catch the signals with the same phase displacement. The explanation for this will be evident from Figs. 1 and 2 in the attached drawings.

Figure 1:
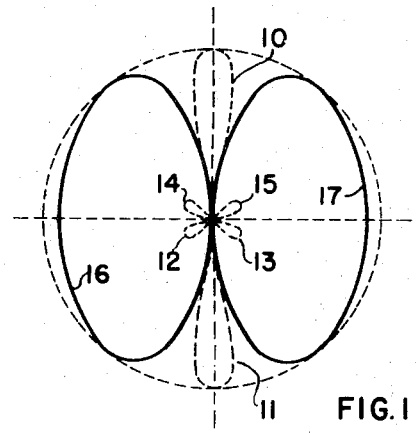
Fig. 1 represents the radiation patterns of the radiating system of a talking radio beacon.

In Fig. 1 the different directional characteristics of the transmitter antennas of the speaking radio beacon are shown. The cigar-formed characteristic lobe for the bearing indicating field is indicated by reference numeral 10. In some of the speaking radio beacons one may also use the contra lobe 11 of the lobe 10. One arrangement in which this takes place is for instance described in applicant's copending applications Serial No. 329,521, filed concurrently herewith and Serial No. 219,139, filed April 4, 1951. The side lobes are indicated by the reference characters 12, 13, 14 and 15. The two lobes of the covering field are indicated by the reference characters 16 and 17, respectively.

Figure 2:
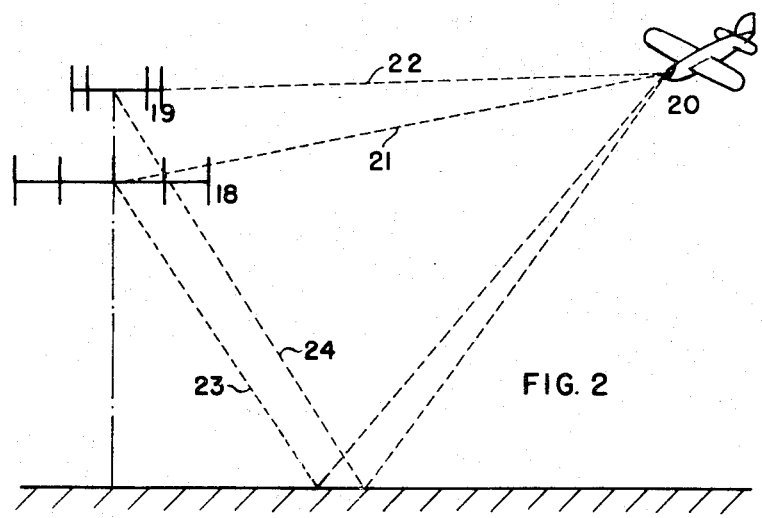
Fig. 2 is a diagrammatic representation of a talking radio beacon serving as a navigational aid to an aircraft.
Figure 3:
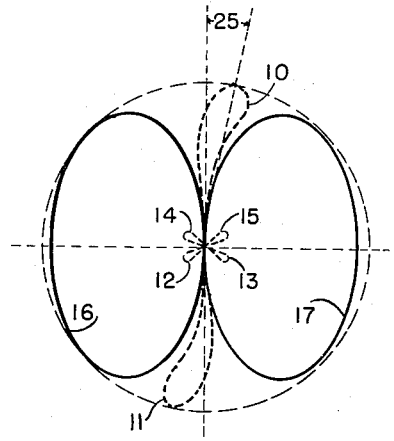
Fig. 3 represents the radiation patterns of the radiating system of a talking radio beacon as they are manifest at the receiver on an aircraft seeking navigational aid.

In Fig. 2 a diagrammatic representation of the speaking radio beacon appears, in which the antenna of the bearing indicating signal is indicated by the reference character 18 and the antenna of the signal providing the covering field is indicated by character 19. An approaching airplane is indicated by numeral 20. It is now easily seen, that the receiver on the airplane will be influenced partly by a direct wave, indicated 21 and 22, respectively, dependent upon if it is leaving the antenna 18 or the antenna 19. The receiver is partly also influenced by an indirect wave 23 and 24, respectively, which is reflected on to the ground surface between the beacon and the airplane. Now it is impossible for close traffic to provide correct position between the bearing indicating diagram 10—11 and the covering field diagram 16—17, if these antennas 18, 19 are not placed very close to each other and preferably one antenna above the other one, as indicated in the drawing figure. However, the propagation paths for the reflected waves 23 and 24 will thereby be of different lengths. Beacons of this kind always have to work with rather short waves or high frequencies, and this difference in the propagation path will cause a phase displacement in the receiver, which displacement is understood in the receiver as if no reflected wave had been present but rather that the cigar-formed characteristic lobe had been bent, as shown in Fig. 3. The magnitude of this bending and the direction thereof will of course be dependent upon the circumstances. Determining factors in this respect are, for instance, the height at which the antennas of the transmitter are situated, the distance to the approaching airplane and the altitude of this plane, the rotational direction of the beacon, the reflection capacity of the ground, and several other circumstances. The condition represented in Fig. 3 should therefore only be understood as a chosen example of how the erroneous indication may act.

It is, however, evident from the example according to Fig. 3, that an erroneous indication of the direction is obtained by the angle 25, which may assume such values that they may not be regarded as allowable for a good radio navigation beacon.

The present invention intends to do away with this disadvantage in radio beacons of the described kind. According to the invention arrangements are provided for causing a frequency modulation or a strong phase modulation of the covering field in addition to the amplitude modulation, by means of which the covering field is carrying the tone frequency component. Preferably this frequency or phase modulation should have such a high frequency, that it exceeds the range of audibility.

It is an object of the invention, therefore, to provide a new and improved talking radio beacon which avoids one or more of the above-mentioned disadvantages and limitations of prior such beacons.

It is another object of the invention to provide a new and improved talking radio beacon which is effective to provide accurate navigational aid to an aircraft.

It is a further object of the invention to provide a new and improved radio beacon which transmits bearing information that, insofar as the receiver of such information is concerned, is not adversely affected by nearby objects causing multiple-path transmission to that receiver.

In accordance with the invention, therefore, a radio beacon comprises a radiating system having a first radiation pattern of the shape of a sharply concentrated beam and a second radiation pattern of the general shape of a figure eight disposed with its axis normal to the axis of the aforesaid beam. The radio beacon also includes a circuit for supplying an angularly velocity-modulated carrier-frequency wave signal, a circuit for supplying an audio-frequency modulation signal, and modulation apparatus responsive to said carrier-frequency wave signal and the aforesaid audio-frequency modulation signal for developing a first doubly modulated carrier-frequency wave signal. The radio beacon further includes a circuit for supplying a second carrier-frequency wave signal modulated by periodically recurring audio-frequency bearing information, and means for applying the aforesaid carrier-frequency wave signals to the radiating system. The radio beacon additionally includes driving means coupled to the radiating system for rotating the aforesaid patterns synchronously with the recurring bearing information.

Figure 4:
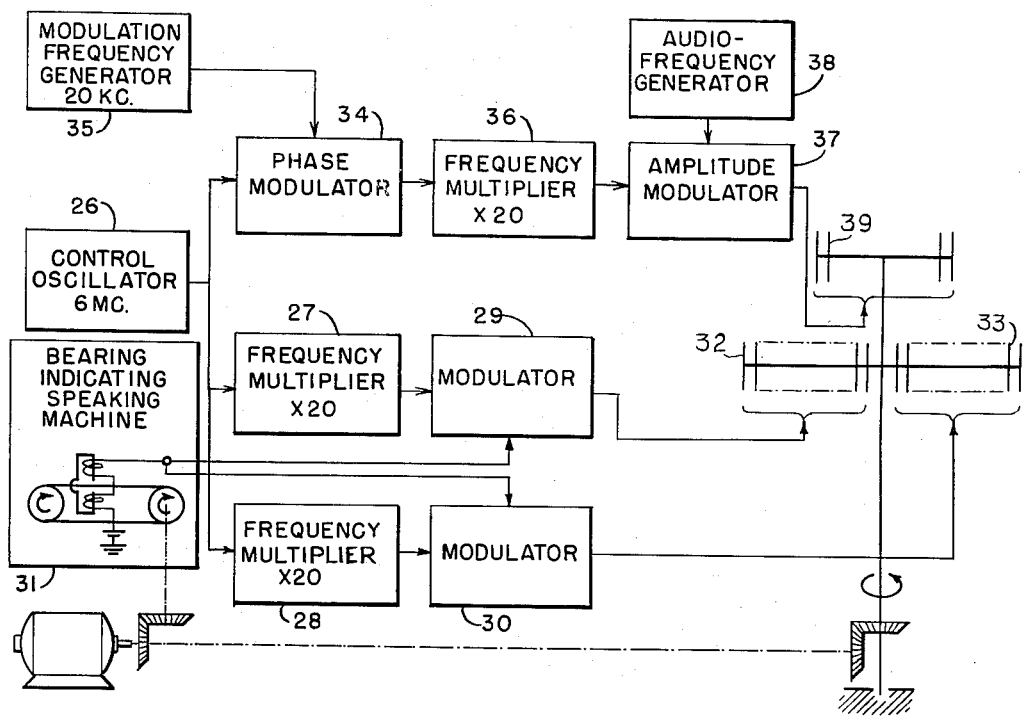
Fig. 4 represents schematically a talking radio beacon in accordance with the present invention.

An arrangement for providing such a field, which should according to the present invention be transmitted as a covering field, is shown in Fig. 4 of the drawings.

In this figure 26 represents a control oscillator, which may for instance have a frequency of 6 megacycles per second. The control oscillator 26 feeds each of two frequency multipliers 27 and 28, which may for instance provide the twentyfold frequency or 120 megacylces per second, said frequency being fed to each of two modulators or end amplifiers 29 and 30, respectively. To these the audio frequency oscillation from a bearing indaicating speaking macihne 31 such as a wire or tape recorder is also carried, so that the oscillations fed to the antennas 32 and 33, respectively, will be amplitude modulated by the bearing indicating statements, which may for instance in the customary way consist in the spoken sound for the English counting words "two," "four," "six" and so on for indicating a bearing of 20°, 40°, 60° and so on. The unit 31 may be of the type disclosed in applicant's above-identified co-pending application. The antennas 32 and 33 therefore transmit by means of their characteristic alobes 10 and 11 this bearing statement.

Further, a phase modulator 34 is fed by the oscillation from the control oscillator 26. The phase modulator obtains its modulation frequency from a modulation frequency generator 35, which may for instance be so arranged that the frequency thereof is in the order of magnitude of 20 kilocycles per second. This frequency should preferably be so high, that it will, after the frequency multiplication has taken place, be above the range of audibility, but it is preferable that originally it be of this order of magnitude. The oscillation phase modulated in said way is fed from the phase modulator 34 to the frequency multiplier 36, which should give the same frequency multiplication as the above mentioned frequency multipliers 27 and 28, so that the oscillation fed to an amplitude modulator and end amplifier 37 will be frequency modulated or possibly phase modulated about a mean frequency, which is coincident with a carrier wave frequency from the antennas 32 and 33. The audio frequency oscillation, used for the covering signal, is created in an audio frequency generator, which may for instance consist of a tooth wheel generator 38, and that oscillation modulates in the usual way the radio frequency or phase modulated oscillation from the frequency multiplier 36. The resultant signal is thereafter fed to the antenna system 39, which is provided to transmit a field with the two directional characteristic lobes 16 and 17, respectively.

It is now evident, that the antennas 32 and 33 will transmit a signal modulated by the bearing indication on the carrier wave of 120 megacycles per second if the control oscillator has the above assumed frequency of 6 magacycles per second and if the frequency multipliers give the twentyfold frequency. Simultaneously the antenna system 39 is transmitting a covering field with a mean frequency of 120 megacycles per second, which will, however, in the chosen example be frequency modulated at 400 kilocycles per second, and this combined oscillation is further amplitude modulated by the audio frequency oscillation obtained from the audio frequency generator 38, for instance 400 cycles per second.

In this way one effectively precludes that the covering field will, during all of or the greater part of the reception of a given bearing indication, for instance the sound for the English counting word "two," have a fixed phase displacement in relation to the signal from the antenna 32 or the antenna 33, and consequently the cigar-formed characteristic lobe 10 or 11 will also not be bent in the way indicated in connection with Fig. 3. During the reception of the signal "two" as well as any other bearing indicating signal, the field will thus pass to and fro in phase a very great number of times, and the frequency of this pendulum movement will be far above the audibility range.

Instead of the above mentioned bending of the field lobes 10 and 11, these lobes will perhaps be widened a little, but this widened part in its mean value will, due to the high frequency by which the covering field has been frequency modulated, be of rather low field intensity. Also this part of the radiation of the antennas 32 and 33 will be blanketed by the field pattern from the antenna system 39, so that if unavoidably thereby some part of an adjacent bearing indication, for instance "zero" or "four" be received by the antenna of the receiver per se, this bearing indication will be overwhelmed in the loudspeaker or the telephone of the receiver effectively by the 400 period modulation tone of the covering field so that it is not audible to the listener.

The invention is of course not limited to the shown and described embodiment, but different modifications may be made within the frame of the invention. For instance, the different antennas provided may be of other types than that which has been shown, and also frequencies and multiplying relations may be other than the above stated ones. It is not even necessary to use a frequency multiplier, but one may also directly create the high transmitted frequencies. If frequency multipliers are used, they may be interconnected in such a way, that they provide a frequency multiplication either before the amplitude modulation or after this. Also in other respects the arrangement may be modified.

What is claimed is:

1. A radio beacon comprising: a radiating system having a first radiation pattern of the shape of a sharply concentrated beam and a second radiation pattern of the general shape of a figure eight disposed with its axis normal to the axis of said beam; a circuit for supplying an angularly velocity-modulated carrier-frequency wave signal; a circuit for supplying an audio-frequency modulation signal; modulation apparatus responsive to said carrier-frequency wave signal and said audio-frequency modulation signal for developing a first doubly modulated carrier-frequency wave signal; a circuit for supplying a second carrier-frequency wave signal modulated by periodically recurring audio-frequency bearing information; means for applying said carrier-frequency wave signals to said radiating system; and driving means coupled to said system for rotating said patterns synchronously with said recurring bearing information.

2. A radio beacon comprising: a radiating system having a first radiation pattern of the shape of a sharply concentrated beam and a second radiation pattern of the general shape of a figure eight disposed with its axis normal to the axis of said beam; a circuit for supplying an angularly velocity-modulated carrier-frequency wave signal; a circuit for supplying an audio-frequency modulation signal; modulation apparatus responsive to said carrier-frequency wave signal and said audio-frequency modulation signal for developing a first doubly modulated carrier-frequency wave signal; a circuit for supplying a second carrier-frequency wave signal modulated by periodically recurring audio-frequency bearing information; said carrier-frequency wave signals having the same mean frequency; means for applying said carrier-frequency wave signals to said radiating system; and driving means coupled to said system for rotating said patterns synchronously with said recurring bearing information.

3. A radio beacon comprising: a radiating system having a first radiation pattern of the shape of a pair of sharply concentrated beams with a common axis and a second radiation pattern of the general shape of a figure eight disposed with its axis normal to the axis of said beam; a circuit for supplying an angularly velocity-modulated carrier-frequency wave signal; a circuit for supplying an audio-frequency modulation signal; modulation apparatus responsive to said carrier-frequency wave signal and said audio-frequency modulation signal for developing a first doubly modulated carrier-frequency wave signal; a circuit for supplying a second carrier-frequency wave signal modulated by periodically recurring audio-frequency bearing information; means for applying said carrier-frequency wave signals to said radiating system; and driving means coupled to said system for rotating said patterns synchronously with said recurring bearing information.

4. A radio beacon comprising: a radiating system including a first antenna system having a first radiation pattern of the shape of a sharply concentrated beam and including a second antenna system having a second radiation pattern of the general shape of a figure eight disposed with its axis normal to the axis of said beam; a circuit for supplying an angularly velocity-modulated carrier-frequency wave signal; a circuit for supplying an audio-frequency modulation signal; modulation apparatus responsive to said carrier-frequency wave signal and said audio-frequency modulation signal for developing a first doubly modulated carrier-frequency wave signal; a circuit for supplying a second carrier-frequency wave signal modulated by periodically recurring audio-frequency bearing information; means for applying said first modulated carrier-frequency wave signal to said second antenna system and for applying said second modulated carrier-frequency wave signal to said first antenna system; and driving means coupled to said system for rotating said patterns synchronously with said recurring bearing information.

5. A radio beacon comprising: a radiating system including a first antenna system having a first radiation pattern of the shape of a sharply concentrated beam and including a second antenna system disposed above and in close proximity to said first antenna system and having a second radiation pattern of the general shape of a figure eight disposed with its axis normal to the axis of said beam; a circuit for supplying an angularly velocity-modulated carrier-frequency wave signal; a circuit for supplying an audio-frequency modulation signal; modulation apparatus responsive to said carrier-frequency wave signal and said audio-frequency modulation signal for developing a first doubly modulated carrier-frequency wave signal; a circuit for supplying a second carrier-frequency wave signal modulated by periodically recurring audio-frequency bearing information; means for applying said first modulated carrier-frequency wave signals to said second antenna system and for applying said second modulated carrier-frequency wave signal to said first antenna system; and driving means coupled to said system for rotating said patterns synchronously with said recurring bearing information.

6. A radio beacon comprising: a radiating system having a first radiation pattern of the shape of a sharply concentrated beam and a second radiation pattern of the general shape of a figure eight disposed with its axis normal to the axis of said beam; a circuit for supplying an angularly velocity-modulated carrier-frequency wave signal; a circuit for supplying a continuous audio-frequency tone signal; modulation apparatus responsive to said carrier-frequency wave signal and said tone signal for developing a first doubly modulated carrier-frequency wave signal; a circuit for supplying a second carrier-frequency wave signal modulated by periodically recurring audio-frequency bearing information; means for applying said carrier-frequency wave signals to said radiating system; and driving means coupled to said system for rotating said patterns synchronously with said recurring bearing information.

7. A radio beacon comprising: a radiating system having a first radiation pattern of the shape of a sharply concentrated beam and a second radiation pattern of the general shape of a figure eight disposed with its axis normal to the axis of said beam; a circuit for supplying an angularly velocity-modulated carrier-frequency wave signal in which the modulation component thereof has a frequency higher than the range of audibility; a circuit for supplying an audio-frequency modulation signal; modulation apparatus responsive to said carrier-frequency wave signal and said audio-frequency modulation signal for developing a first doubly modulated carrier-frequency wave signal; a circuit for supplying a second carrier-frequency wave signal modulated by periodically recurring audio-frequency bearing information; means for applying said carrier-frequency wave signals to said radiating system; and driving means coupled to said system for rotating said patterns synchronously with said recurring bearing information.

8. A radio beacon comprising: a radiating system having a first radiation pattern of the shape of a sharply concentrated beam and a second radiation pattern of the general shape of a figure eight disposed with its axis normal to the axis of said beam; a circuit including a carrier-frequency oscillator for supplying an angularly velocity-modulated carrier-frequency wave signal; a circuit for supplying an audio-frequency modulation signal; modulation apparatus responsive to said carrier-frequency wave signal and said audio-frequency modulation signal for developing a first doubly modulated carrier-frequency wave signal; a circuit including said oscillator for supplying a second carrier-frequency wave signal modulated by periodically recurring audio-frequency bearing information; means for applying said carrier-frequency wave signals to said radiating system; and driving means coupled to said system for rotating said patterns synchronously with said recurring bearing information.

9. A radio beacon comprising: a radiating system having a first radiation pattern of the shape of a sharply concentrated beam and a second radiation pattern of the general shape of a figure eight disposed with its axis normal to the axis of said beam; a circuit including a carrier-frequency oscillator, a modulation-signal generator therefor producing a modulation signal having a frequency within the range of audibility, and a modulator for supplying an angularly velocity-modulated carrier-frequency wave signal; a circuit for supplying an audio-frequency modulation signal; modulation apparatus responsive to said carrier-frequency wave signal and said audio-frequency modulation signal for developing a first doubly modulated carrier-frequency wave signal; a circuit for supplying a second carrier-frequency wave signal modulated by periodically recurring audio-frequency bearing information; means for applying said carrier-frequency wave signals to said radiating system; and driving means coupled to said system for rotating said patterns synchronously with said recurring bearing information.

10. A radio beacon comprising: a radiating system having a first radiation pattern of the shape of a sharply concentrated beam and a second radiation pattern of the general shape of a figure eight disposed with its axis normal to the axis of said beam; a circuit for supplying an angularly velocity-modulated carrier-frequency wave signal; a circuit for supplying an audio-frequency modulation signal; amplitude-modulation apparatus responsive to said carrier-frequency wave signal and said audio-frequency modulation signal for developing a first doubly modulated carrier-frequency wave signal; a circuit for supplying a second carrier-frequency wave signal amplitude-modulated by periodically recurring audio-frequency bearing information; means for applying said carrier-frequency wave signals to said radiating system; and driving means coupled to said system for rotating said patterns synchronously with said recurring bearing information.

11. A radio beacon comprising: a radiating system having a first radiation pattern of the shape of a sharply concentrated beam and a second radiation pattern of the general shape of a figure eight disposed with its axis normal to the axis of said beam; a circuit including a frequency multiplier for supplying an angularly velocity-modulated carrier-frequency wave signal; a circuit for supplying an audio-frequency modulation signal; modulation apparatus responsive to said carrier-frequency wave signal and said audio-frequency modulation signal for developing a first doubly modulated carrier-frequency wave signal; a circuit including a frequency multiplier for supplying a second carrier-frequency wave signal modulated by periodically recurring audio-frequency bearing information; means for applying said carrier-frequency wave signals to said radiating system; and driving means coupled to said system for rotating said patterns synchronously with said recurring bearing information.

12. A radio beacon comprising: a radiating system having a first radiation pattern of the shape of a sharply concentrated beam and a second radiation pattern of the general shape of a figure eight disposed with its axis normal to the axis of said beam; a circuit including a carrier-frequency oscillator, a modulation-signal generator therefor, a phase modulator coupled to said oscillator and said generator, and a frequency multiplier coupled to said modulator for supplying an angularly velocity-modulated carrier-frequency wave signal; a circuit for supplying an audio-frequency modulation signal; amplitude-modulation apparatus responsive to said carrier-frequency wave signal and said audio-frequency modulation signal for developing a first doubly modulated carrier-frequency wave signal; a circuit including said oscillator, a frequency multiplier coupled thereto, and an amplitude modulator coupled to said last-mentioned frequency multiplier for supplying a second carrier-frequency wave signal amplitude-modulated by periodically recurring audio-frequency bearing information; means for applying said carrier-frequency wave signals to said radiating system; and driving means coupled to said system for rotating said patterns synchronously with said recurring bearing information.

References Cited in the file of this patent

UNITED STATES PATENTS

| | | |
|---|---|---|
| 2,129,004 | Greig | Sept. 6, 1938 |
| 2,212,238 | Kolster | Aug. 20, 1940 |
| 2,279,031 | Cockerell et al. | Apr. 7, 1942 |
| 2,424,079 | Dome | July 15, 1947 |
| 2,513,493 | Kliever | July 4, 1950 |